United States Patent [19]
Bray

[11] 3,947,751
[45] Mar. 30, 1976

[54] ELECTRONIC VARIAC SURGE CURRENT LIMITING CIRCUIT

[75] Inventor: William Edward Bray, Houston, Tex.

[73] Assignee: Texas Instruments Inc. Dallas, Tex.

[22] Filed: June 24, 1974

[21] Appl. No.: 482,388

[52] U.S. Cl. .................... 323/9; 307/293; 323/34; 323/37
[51] Int. Cl.² ............................................ G05F 1/10
[58] Field of Search ........ 307/293; 323/4, 9, 34–39, 323/23

[56] References Cited
UNITED STATES PATENTS

| | | | |
|---|---|---|---|
| 3,353,078 | 11/1967 | Maynard | 323/34 |
| 3,363,143 | 1/1968 | Cavanaugh | 323/23 |
| 3,479,560 | 11/1969 | Paget et al. | 323/36 |
| 3,500,174 | 3/1970 | Ellerbeck | 307/293 X |
| 3,548,290 | 12/1970 | Swinehart | 323/36 X |
| 3,660,687 | 5/1972 | Sahm et al. | 307/293 X |
| 3,732,484 | 5/1973 | McKenna | 323/36 X |
| 3,821,634 | 6/1974 | Sabolic | 323/36 X |

Primary Examiner—William M. Shoop

[57] ABSTRACT

A circuit having a gated, symmetrical switch is provided for insertion between an AC source of power and a load, and prevents a surge current from entering the load when the AC input is initially applied. A symmetrical negative resistance device that begins conducting at a prescribed voltage and remains on as a constant voltage regulator until the AC input voltage drops below a sustaining value is connected to provide the prescribed voltage to the gate control of the gated symmetrical switch. An RC circuit controls the length of time required for the AC input voltage to reach the prescribed voltage at the input to the symmetrical negative resistance device. At least part of the resistance in the RC circuit is of the negative temperature coefficient type, resulting in the resistance value decreasing as the temperature of the negative temperature coefficient device increases, thereby shortening the time after which the prescribed voltage to the symmetrical negative resistance device is applied.

11 Claims, 2 Drawing Figures

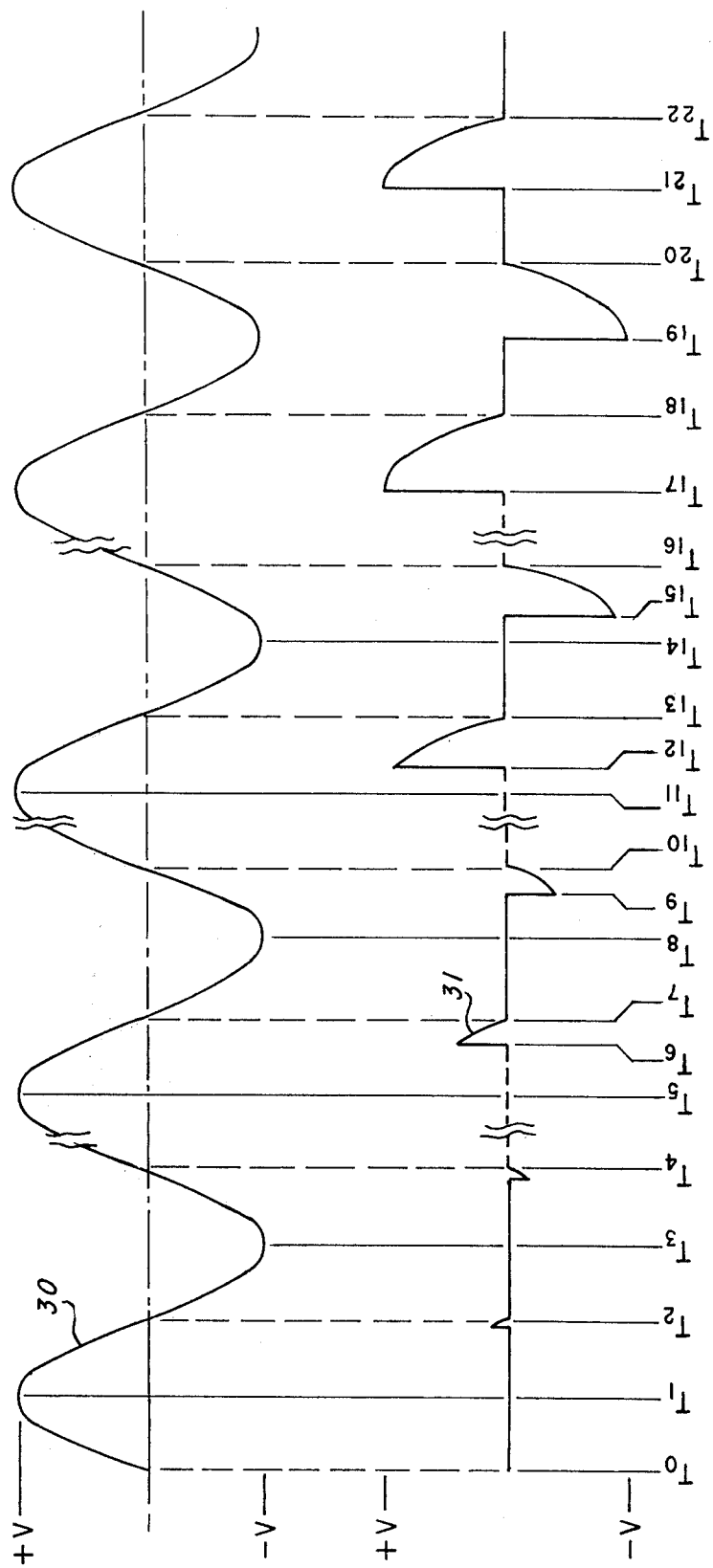

ELECTRONIC VARIAC SURGE CURRENT LIMITING CIRCUIT

BACKGROUND OF THE INVENTION

This invention relates to a circuit for controlling the input AC current to a load. More particularly, it pertains to a circuit for limiting the AC input to a load when the AC input is initially applied. The circuit provides for an incremental increase in the current into the load until an equilibrium point is reached.

DESCRIPTION OF THE PRIOR ART

A common prior art circuit for controlling surge current is one employing a timed relay which is closed for a period of time intended to permit settling of the switch contacts and damping out of other transients. Then the relay contacts are opened, permitting the AC input to be applied to the load. This type of circuit has certain applications, but cannot be used where the load must not initially receive the total AC input voltage. This circuit requires a large relay which does not necessarily open at an optimum point with respect to the incoming AC voltage.

Another prior art circuit in common use is the zero-crossing detector. The circuit is designed so that the input AC voltage is applied to the load when the voltage wave form crosses through zero. This circuit has many applications, but as in the case of the relay controlled circuit mentioned above, it cannot be used in a situation where the load device should not receive the initial full amplitude of AC voltage.

This invention provides for a gradually applied portion of the input AC voltage until the maximum voltage is ultimately reached.

BRIEF SUMMARY OF THE INVENTION

The surge current limiting circuit utilizes the unique features of three electronic devices:
 a gated, symmetrical switch;
 symmetrical, negative resistance device;
 a negative temperature coefficient device.

The gated, symmetrical switch allows current flow in either direction when the proper amplitude and polarity is present on the gate control. The symmetrical, negative resistance device is connected to the gate control and permits only a prescribed voltage to be presented on the gate control, the voltage being of either polarity. The negative temperature coefficient device is part of an RC circuit which is connected to control the amount of voltage present at the input of the symmetrical negative resistance device. As the negative temperature coefficient device heats up, its resistance drops, thereby reducing the time required by the RC circuit to reach a predetermined voltage for presentation to the input of the symmetrical, negative resistance device. The values of capacitance and of the negative temperature coefficient device are selected such that the operation is over a range as desired, typically permitting no operation for a period of time, for example, 300 milliseconds, to permit the damping of any bouncing of the main switch contacts.

The main object of this invention is to provide a circuit that permits a small portion of an input AC voltage as it is applied to a load at a predetermined time, incrementing the portion until a desired amplitude and time duration is reached.

This and other objects are set out in the detailed description that follows.

BRIEF DESCRIPTION OF THE DRAWINGS

FIG. 2 illustrates the input AC waveform, truncated. Also, shown is the corresponding output of the gated, symmetrical switch.

DETAILED DESCRIPTION OF THE INVENTION

Figure 1:
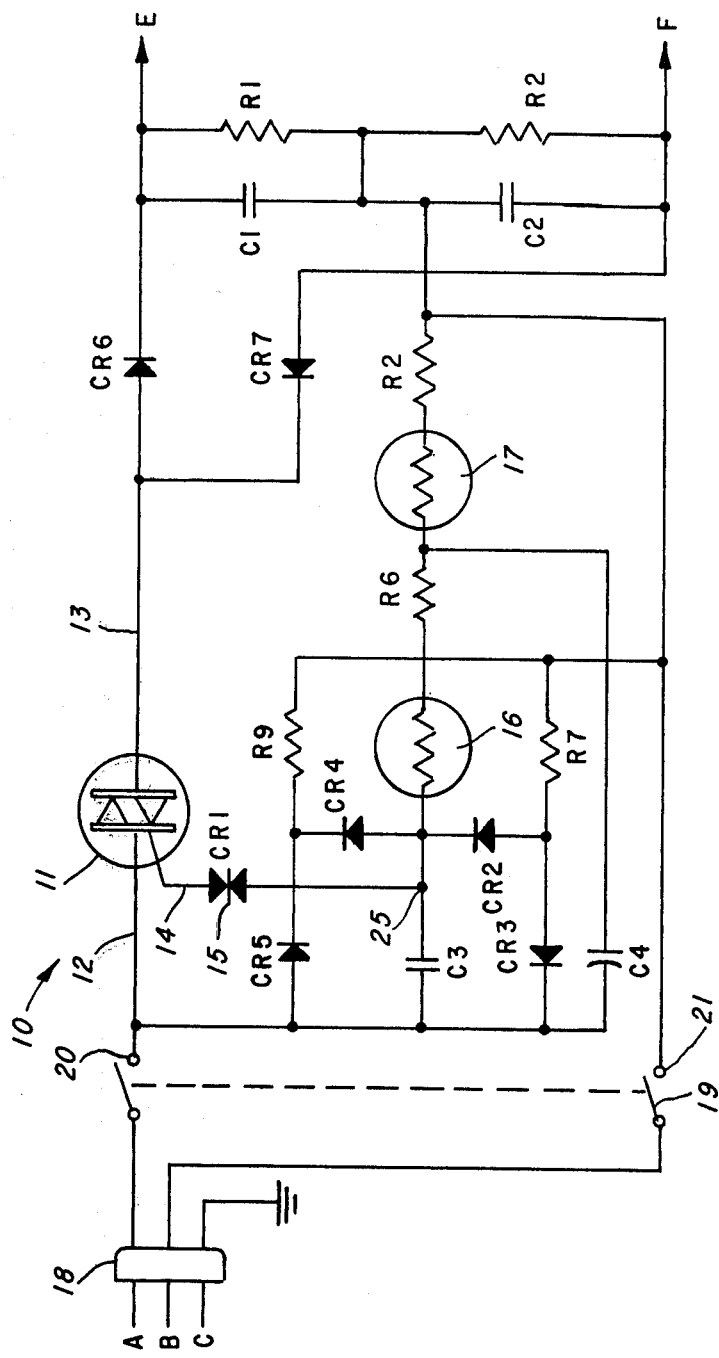
FIG. 1 is a schematic drawing of the surge current limiting circuit.

FIG. 1 illustrates a source of alternating current input present at terminal block 18, which is capable of being selectively switched through switch 19 to terminals 20 and 21. This input voltage is to be applied to a voltage doubling circuit made up of diodes CR6 and CR7, capacitors C1 and C2, and resistors R1 and R2.

Common input A serves to provide one side of the input AC waveform, through switch 19 to terminal 20. Common input B, through switch 19, is presented on terminal 21. Input C is grounded. The voltage measured across terminal 20–21 is a voltage that must be limited by surge current limiting circuit 10.

The gated, symmetrical switch 11 is a triac. Triac 11 has a main electrode 12 connected to input terminal 20, and a second main electrode 13 connected to the anode of rectifying diode CR6 and to the cathode of rectifying diode CR7. Gate control electrode 14 of triac 11 is connected to one side of symmetrical negative resistance device 15, whose input is connected to one terminal of capacitor C3, whose other terminal is connected to terminal 20. In the preferred embodiment the negative resistance device 15 is a diac. The input terminal of diac 15 is also connected to the cathode of bridge diode CR2 and to the anode of bridge diode CR4. The input is also connected to negative temperature coefficient device 16, which, in this preferred embodiment, is a thermistor. Bridge diode CR5 has its anode connected to input terminal 20 and its cathode connected to the junction between the cathode of bridge diode CR4 and one end of resistor R9, whose other end is connected to input terminal 21. The series path of diode CR5 and resistor R9 provides a current flow for properly biasing bridge diode CR4. Likewise, the series combination of resistor R7 whose one end is connected to terminal 21 and whose other end is connected to the anode of bridge diode CR2 and to the anode of bridge diode CR3, the diode CR3 provide proper biasing for bridge diode CR2.

In this preferred embodiment, a second ramp voltage capacitor C4 is connected between input terminal 20 and one end of resistor R6, whose other end is connected to thermistor 16. The other terminal of capacitor C4 is also connected to one end of thermistor 17, the other end of which is connected to one end of resistor R2. The other end of resistor R2 is connected to input terminal 21. The bridge made up of diodes CR2–CR5 is employed to provide a discharge path for capacitors C3 and C4 so that zero voltage is present for one-half of each half cycle, positive and negative.

In the preferred embodiment herein shown, diodes CR6 and CR7 are connected respectively to one end of capacitor C1 and resistor R1, and to capacitor C2 and resistor R2. This voltage doubling circuit provides a DC output across terminals E and F.

MODE OF OPERATION

Referring now to FIG. 2, waveform 30 is shown illustrating the input AC voltage. Waveform 31 illustrates the output of triac 11. A study of these two waveforms illustrates that the conduction angle of the triac is selectively varied. When the power is first applied, the resistance of each of the termistors 16 and 17 of FIG. 1 is so high that capacitors C3 and C4 are never charged enough to cause conduction of diac 15, thereby keeping the triac 11 cut off for a period of time determined by the characteristics of thermistors 16 and 17. In this preferred embodiment, these characteristics are selected so that there is no conduction of triac 11 for a period of approximately 300 milliseconds. This time is chosen, as mentioned earlier, to permit the damping of any bouncing of the main switch contacts. Therefore, time T1 shown in FIG. 2 is some time in excess of 300 milliseconds from the time that the switch 19 is closed. Then triac 11 begins conducting at 175°, shown occurring just before time T2. The triac 11 is shown conducting in the opposite direction just before time T4. Several cycles later, triac 11 is shown conducting starting at time T6 and ending at time T7. During that same full cycle, triac 11 is shown conducting in the opposite direction starting at time T9 and ending at time T10. This angle of conduction is approximately 30°. At some later time, after several cycles of input AC voltage 30 have occurred, triac 11 again conducts at time T12 and turns off at time T13, and during the same input AC cycle, turns on again in the opposite direction at time T15 and turns off at time T16. After several more cycles of the input AC voltage 30, the circuit has stabilized and triac 11 begins conduction at time T17 which corresponds to 90° and turns off at time T18 which corresponds to 180°. During the same input AC cycle, triac 11 again conducts in the opposite direction at time T19 and ends conduction at time T20, a 90° conduction phase. Waveform 31 illustrates one more positive pulse starting at time T21 and ending at time T22, again a 90° conduction phase.

Referring again to FIG. 1, when terminal 21 begins going positive, the cathode of diode CR4 also begins going positive, keeping it cut off. Junction point 25 also begins going positive, but is limited in time by the combination of thermistor 16, resistor R6 and capacitor C3. Also, in the preferred embodiment, a second capacitor C4 is connected in parallel across the series circuit of capacitor C3, thermistor 16, and resistor R6. Thermistor 17 and resistor R2 complete the charging path for capacitor C4. Dependent on the RC time constant, the voltage at junction 25 goes high enough to turn on diac 15, which in turn activates triac 11 by way of presenting an appropriate control voltage on gate control 14 of triac 11. When the voltage at terminal 21, and at the cathode of CR4 goes to zero and then negative, CR4 conducts, and capacitor C3 discharges through CR4, resistors R9 and R7 and through bridge diode CR3. Capacitor C4 is also discharged through thermistor 17 and resistor R2 and also through R6 and thermistor 16 and then through the discharge path described for capacitor C3. As thermistors 16 and 17 begin to rise in temperature because of the current flow through them, their resistances go down and the charge time for capacitors C3 and C4 decreases, causing junction 25 to attain the necessary voltage sooner. Likewise, when terminal 21 goes negative, diodes CR2 and CR3 are cut off. When the negative potential at junction 25 reaches a predetermined value, diac 15 again conducts, but in the opposite direction, providing negative voltage on gate control 14 of triac 11. This negative voltage causes triac 11 to conduct in the opposite direction. When terminal 21 goes to zero, and then positive, diode CR2 conducts, discharging capacitor C3. The resistances of thermistors 16 and 17 respectively, decrease, and again the junction 25 reaches its critical voltage sooner, thus turning on triac 11 for an incrementally larger conduction angle until equilibrium is reached.

In the preferred embodiment, in a voltage doubling circuit, diodes CR6 and CR7 provide a full wave rectified output which is applied to the capacitors C1 and C2 and resistor R1 and R2, resulting in a DC voltage across output terminal E-F.

In this preferred embodiment, the operating point of thermistor 17 is chosen for a change of approximately 30 to 1. The operating point of thermistor 16 is selected for a change of approximately 20 to 1. This choice prevents any conduction of triac 11 for a period of approximately 300 milliseconds — until the resistance of thermistors 16 and 17 decreases to the point where the RC charge time becomes small enough to permit a critical charge voltage on capacitors C3 and C4.

The open circuit stage gain can be determined from:

$$A = \frac{1}{\left[1 + \left(\frac{f_1}{f_2}\right)^2\right]^{1/2}}$$

where: A = stage gain $$f_2 = \frac{1}{2\pi RC}$$

The associated phase shift $$\theta = \arctan \frac{f_1}{f_2}$$

The first RC gives $f_2 = 117$ Hz for a stage gain of:

$$A_1 = \frac{1}{\left[1 + \left(\frac{60}{117}\right)^2\right]^{1/2}} = 0.89$$

With an associated phase shift of $$\theta = \arctan \frac{f_1}{f_2} = 27°$$

The total stage gain is determined from combining the first RC with the second RC using Thevenian's Theorem:

$$f_3 = \frac{1}{6.28 \times 0.068 \text{ MFD } (18K + |18K| + 7K)} = 54 \text{ Hz}$$

$$A_2 = \frac{1}{\left[1 + \left(\frac{60}{54}\right)^2\right]^{1/2}} = 0.69$$

$$\theta = \arctan \frac{f_1}{f_3} = 48°$$

The total phase shift seen at the diac is equal to $$|R_1C_1| + |R_2C_2| + 27° + 48° = 75°$$

However, a third phase shift yet must be considered to find the trigger point of the triac. This is determined by the breakover point of the diac and peak voltage at across the diac input capacitor.

115 VAC × 0.89A₂ × 0.69A₂ = 71 VAC RMS

71 VAC × 1.414 = 100 VAC PEAK $$\text{ARC SIN } \frac{28 \text{ VAC DIAC BREAKOVER}}{100 \text{ VAC PEAK}} = 16°$$

Resulting in a total phase shift of

27° + 48° + 16° = 91°

The diode bridge CR2, CR3, CR4 and CR5 serve to discharge the capacitor C3 on every half-cycle. This eliminates a hysteresis effect that can produce false triac triggers on one or more of the first half-cycles after turn on.

The resistance of each of the thermistors can be related to absolute temperature by:

$$\frac{R_F(T_F)}{R_C(T_i)} = \epsilon^B \left( \frac{1}{T_F} - \frac{1}{T_i} \right)$$

Where:
$R_C$ = Initial Resistance
$R_F$ = Final Resistance
$T_i$ = Initial Temperature in °K
$T_F$ = Final Temperature in °K
B = 4115 for Bead Thermistor Material
For thermistor 17:

$$\frac{R_F}{150K} = \epsilon^B \left( \frac{1}{125+273} - \frac{1}{25+273} \right)$$

$= \epsilon^{-3.48}$ or $R_F = 150K \times 0.0308 = 4.62K$

For thermistor 16:

$$\frac{R_F}{150K} = \epsilon^B \left( \frac{1}{110+273} - \frac{1}{25+273} \right)$$

$= \epsilon^{-3.06}$ or $R_F = 150K \times 0.047 = 7K$

Those skilled in the art understand that this invention includes a negative coefficient of temperature device and is not limited to a thermistor. Likewise, any gated, symmetrical switch may be employed and is not limited to a triac. For example, a pair of silicon controlled rectifiers, oppositely connected could be used. Likewise, the symmetrical, negative resistance device may be a diac, or it may be a pair of diodes appropriately connected in series to take advantage of the reverse voltage characteristic of each.

What is claimed is:

1. A surge current limiting circuit having input and output means, for connection to a source of alternating current input comprising:
  a. gated symmetrical switch means, having a first and second main electrode and a gate control electrode, the first main electrode being operatively connected to the input means and the second main electrode being operatively connected to the output means;
  b. threshold voltage means having an input, and an output connected to the control electrode for providing a voltage to the control electrode when a prescribed voltage is reached, either positive or negative; and
  c. variable voltage ramp means having an output connected to the input of the threshold voltage means and an input connected to receive the alternating current, including an RC circuit wherein at least part of the resistance is of the negative temperature coefficient type for incrementally decreasing the time required for the ramp voltage to reach the prescribed voltage, and including a diode bridge circuit operatively connected to discharge the capacitance of the RC circuit during the first half of each half cycle of the alternating current input.

2. The circuit of claim 1 wherein the threshold voltage means is a diac and the negative temperature coefficient resistance is a thermistor.

3. The circuit of claim 1 wherein the voltage ramp means further comprise a diode bridge circuit operatively connected to discharge the capacitance of the RC circuit during the first half of each half cycle of the alternating current input.

4. The circuit of claim 1 wherein the symmetrical switch means comprise a triac.

5. The circuit of claim 2 wherein the symmetrical switch means comprise a triac.

6. The circuit of claim 1 wherein the capacitance and thermistor of the RC circuit are selected to reach the prescribed voltage, after a predetermined time, at 175° and at 355° of the alternating current input until equilibrium is reached, at which time the prescribed voltage is reached at 90° and at 270°.

7. A surge current limiting circuit having input and output means, for connection to a source of alternating current input comprising:
  a. gated symmetrical switch means, having a first and second main electrode and a gate control electrode, the first main electrode being operatively connected to the input means and the second main electrode being operatively connected to the output means;
  b. threshold voltage means having an input, and an output connected to the control electrode for providing a voltage to the control electrode when a prescribed voltage is reached, either positive or negative; and
  c. variable voltage ramp means, having an output connected to the input of the threshold voltage means and an input connected to receive the alternating current, including a first RC circuit wherein at least part of the resistance is of the negative temperature coefficient type and including a second RC circuit wherein at least part of the resistance is of the negative temperature coefficient type.

8. The circuit of claim 7 wherein the voltage ramp means further comprise a diode bridge circuit operatively connected to discharge the capacitance of the first and second RC circuit during the first half of each half cycle of the alternating current input.

9. The circuit of claim 8 wherein the threshold voltage means is a diac and the negative temperature coefficient resistance of each of the first and second RC circuits is a thermistor.

10. The circuit of claim 9 wherein the symmetrical switch means comprise a triac.

11. The circuit of claim 7 wherein the capacitance and thermistor of each of the RC circuits are selected to reach the prescribed voltage after a predetermined time, at 175° and at 355° of the alternating current input until equilibrium is reached, at which time the prescribed voltage is reached at 90° and at 270°.

* * * * *